(12) United States Patent
Stanavich et al.

(10) Patent No.: US 10,344,646 B2
(45) Date of Patent: Jul. 9, 2019

(54) EXHAUST GAS BURNER ASSEMBLY

(71) Applicant: Tenneco Automotive Operating Company Inc., Lake Forest, IL (US)

(72) Inventors: John Stanavich, Chelsea, MI (US); Jeffery Davis, Livonia, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/106,780

(22) Filed: Aug. 21, 2018

(65) Prior Publication Data
US 2018/0355777 A1 Dec. 13, 2018

(51) Int. Cl.
*F01N 3/20* (2006.01)
*F01N 13/08* (2010.01)
*B01D 53/94* (2006.01)
*F01N 3/025* (2006.01)

(52) U.S. Cl.
CPC ....... *F01N 3/2033* (2013.01); *B01D 53/9431* (2013.01); *F01N 3/025* (2013.01); *F01N 3/2066* (2013.01); *F01N 13/08* (2013.01); *F01N 2240/14* (2013.01); *F01N 2240/20* (2013.01); *F01N 2470/02* (2013.01); *F01N 2490/08* (2013.01); *F01N 2610/03* (2013.01)

(58) Field of Classification Search
CPC ........ F01N 3/2033; F01N 3/025; F01N 13/08; F01N 2240/14; F01N 2240/20; F01N 2470/02
USPC ............ 422/183, 182; 60/286, 303; 431/354
See application file for complete search history.

(56) References Cited

U.S. PATENT DOCUMENTS

| | | | | |
|---|---|---|---|---|
| 5,140,814 A | * | 8/1992 | Kreutmair | F01N 3/025 55/466 |
| 5,320,523 A | * | 6/1994 | Stark | F01N 3/2033 431/158 |
| 5,339,630 A | * | 8/1994 | Pettit | F01N 3/2033 431/354 |
| 2010/0192546 A1 | * | 8/2010 | Nohl | F01N 3/0256 60/286 |
| 2012/0322012 A1 | * | 12/2012 | Tsumagari | F01N 3/0256 431/159 |
| 2015/0354432 A1 | | 12/2015 | Gehrlein et al. | |
| 2016/0071825 A1 | * | 3/2016 | Choi | G11C 7/10 257/777 |
| 2016/0131007 A1 | * | 5/2016 | Kauderer | B01D 53/9418 422/177 |

FOREIGN PATENT DOCUMENTS

JP 5867279 2/2016
KR 101363407 2/2014

* cited by examiner

*Primary Examiner* — Tom P Duong
(74) *Attorney, Agent, or Firm* — McGarry Bair PC

(57) ABSTRACT

An exhaust gas burner assembly includes a body, an inlet opening, an outlet opening, a first chamber, a second chamber, and an intermediate opening. The exhaust gas burner assembly also includes a perforated pipe disposed between the first chamber and the second chamber, a fluid injector adapted to discharge a combustible mixture, and an igniter adapted to ignite the combustible mixture to generate combustion products. The perforated pipe allows at least a portion of the exhaust gas to flow therethrough from the first chamber to the second chamber such that the exhaust gas exiting the outlet opening has a higher temperature than the exhaust gas entering through the inlet opening.

20 Claims, 6 Drawing Sheets

EXHAUST GAS BURNER ASSEMBLY

TECHNICAL FIELD

The present disclosure relates to an exhaust gas burner assembly. More particularly, the present disclosure relates to an exhaust gas burner assembly for an exhaust aftertreatment system associated with an internal combustion engine.

BACKGROUND

An internal combustion engine generally employs an aftertreatment system in order to treat exhaust gas before release into the atmosphere. In many situations, a temperature of one or more components of the aftertreatment system, such as a catalytic converter, may have to be maintained at a desired temperature in order to function appropriately and efficiently. During a low load operation of the engine and/or a cold start of the engine, the temperature of the aftertreatment system may be generally low and may require a period of time before the aftertreatment system may heat up and operate as desired.

Typically, a burner assembly is provided in the aftertreatment system upstream of such aftertreatment components. In many situations, the burner assembly may include a combustion liner provided in contact with the exhaust gas stream. A combustible mixture of fuel and air may be ignited within the combustion liner to generate combustion products. The combustion products may be mixed with the exhaust gas in order to heat the exhaust gas to the desired temperature.

In many situations, the combustion liner of the burner assembly may be manufactured using high grade materials in order to withstand high temperature and thermal stress during combustion of the combustible mixture, in turn, increasing equipment costs. Also, in many situations, the burner assembly provided within the aftertreatment system may induce increased backpressure within the aftertreatment system, thus, limiting flow of the exhaust gas and reducing performance of the aftertreatment system. Hence, there is a need for an improved burner assembly for such applications.

Given description covers one or more above mentioned problems and discloses a method and a system to solve the problems.

SUMMARY

In an aspect of the present disclosure, an exhaust gas burner assembly is provided. The exhaust gas burner assembly includes a body extending between an inlet end and an outlet end. The body defines an internal volume. The exhaust gas burner assembly includes an inlet plate coupled to the body at the inlet end. The inlet plate defines an inlet opening adapted to allow ingress of an exhaust gas inside the body along an inlet axis and a combustion opening spaced apart from the inlet opening. The exhaust gas burner assembly further includes an outlet plate coupled to the body at the outlet end. The outlet plate defines an outlet opening adapted to allow egress of the exhaust gas from the body along an outlet axis. The exhaust gas burner assembly further includes an intermediate plate disposed within the body. The intermediate plate divides the internal volume of the body into a first chamber and a second chamber. The intermediate plate further defines an intermediate opening spaced apart from the inlet opening to fluidly couple the first chamber to the second chamber. The exhaust gas burner assembly further includes a perforated pipe disposed in the first chamber between the inlet plate and the intermediate plate. The perforated pipe is fluidly coupled with the intermediate opening. The perforated pipe defines a plurality of openings therethrough. The exhaust gas burner assembly also includes a fluid injector mounted on the inlet plate and fluidly coupled with the combustion opening. The fluid injector is adapted to discharge a combustible mixture. The exhaust gas burner assembly further includes an igniter adapted to ignite the combustible mixture to generate combustion products. The plurality of openings of the perforated pipe allow at least a portion of the exhaust gas to flow to the second chamber such that the exhaust gas exiting the outlet opening has a higher temperature than the exhaust gas entering through the inlet opening.

In another aspect of the present disclosure, an exhaust gas aftertreatment system is provided. The exhaust gas aftertreatment system includes an exhaust gas line adapted to receive exhaust gas from an engine. The exhaust gas aftertreatment system also includes at least one exhaust gas aftertreatment component disposed downstream of the exhaust gas line. The exhaust gas aftertreatment system further includes an exhaust gas burner assembly disposed between the exhaust gas line and the at least one exhaust gas aftertreatment component. The exhaust gas burner assembly includes a body extending between an inlet end and an outlet end. The body defines an internal volume. The exhaust gas burner assembly includes an inlet plate coupled to the body at the inlet end. The inlet plate defines an inlet opening adapted to allow ingress of the exhaust gas inside the body along an inlet axis and a combustion opening spaced apart from the inlet opening. The exhaust gas burner assembly further includes an outlet plate coupled to the body at the outlet end. The outlet plate defines an outlet opening adapted to allow egress of at least the exhaust gas from the body along an outlet axis. The exhaust gas burner assembly further includes an intermediate plate disposed within the body. The intermediate plate divides the internal volume of the body into a first chamber and a second chamber. The intermediate plate further defines an intermediate opening spaced apart from the inlet opening to fluidly couple the first chamber to the second chamber. The exhaust gas burner assembly further includes a perforated pipe disposed in the first chamber between the inlet plate and the intermediate plate. The perforated pipe is fluidly coupled with the intermediate opening. The perforated pipe defines a plurality of openings therethrough. The exhaust gas burner assembly further includes a fluid injector mounted on the inlet plate and fluidly coupled with the combustion opening. The fluid injector is adapted to discharge a combustible mixture. The exhaust gas burner assembly also includes an igniter adapted to ignite the combustible mixture to generate combustion products. The exhaust gas burner assembly further includes a combustion liner disposed within the perforated pipe and adapted to allow flow of the combustion products therethrough. The combustion liner is fluidly coupled with the intermediate opening to allow the combustion products to flow through the intermediate opening to the second chamber. The plurality of openings of the perforated pipe allow flow of at least a portion of the exhaust gas around an outer surface of the combustion liner for cooling the combustion liner. The intermediate opening allows the exhaust gas to flow to the second chamber such that the exhaust gas exiting the outlet opening has a higher temperature than the exhaust gas entering through the inlet opening.

In yet another aspect of the present disclosure, an exhaust gas burner assembly is provided. The exhaust gas burner assembly includes a body extending between an inlet end and an outlet end. The body defines an internal volume. The exhaust gas burner assembly further includes an inlet plate coupled to the body at the inlet end. The inlet plate defines an inlet opening adapted to allow ingress of an exhaust gas inside the body along an inlet axis and a combustion opening spaced apart from the inlet opening. The exhaust gas burner assembly further includes an outlet plate coupled to the body at the outlet end. The outlet plate defines an outlet opening adapted to allow egress of at least the exhaust gas from the body along an outlet axis. The exhaust gas burner assembly further includes a perforated pipe disposed between the inlet plate and the outlet plate. The perforated pipe is fluidly coupled with the outlet opening. The perforated pipe defines a plurality of openings therethrough. The exhaust gas burner assembly further includes a fluid injector mounted on the inlet plate and fluidly coupled with the combustion opening. The fluid injector is adapted to discharge a combustible mixture. The exhaust gas burner assembly also includes an igniter adapted to ignite the combustible mixture to generate combustion products. The exhaust gas burner assembly further includes a vortex plate disposed on the perforated pipe. The vortex plate is adapted to provide a balanced flow of the exhaust gas around the perforated pipe. The exhaust gas exiting the outlet opening has a higher temperature than the exhaust gas entering through the inlet opening.

Other features and aspects of this disclosure will be apparent from the following description and the accompanying drawings.

DETAILED DESCRIPTION

Figure 1:
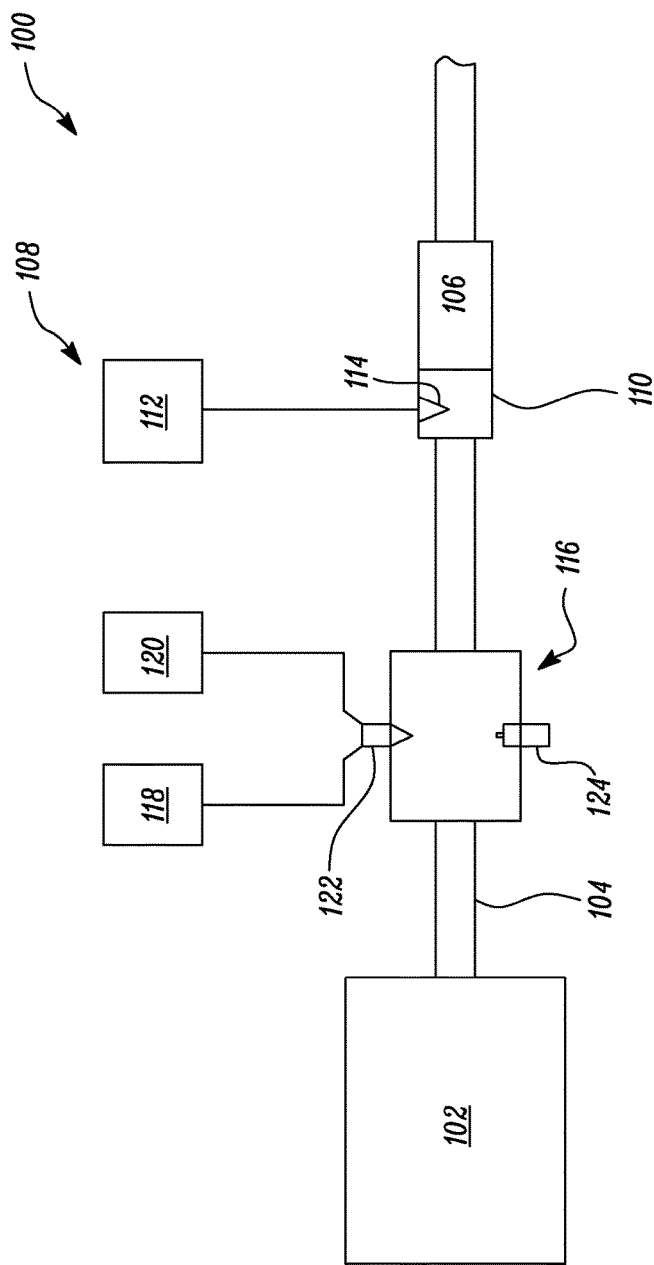
FIG. 1 is schematic representation of an exemplary engine aftertreatment system for an engine, according to an aspect of the present disclosure.

Wherever possible, the same reference numbers will be used throughout the drawings to refer to same or like parts. Referring to FIG. 1, a schematic representation of an exemplary exhaust gas aftertreatment system 100 is illustrated. The exhaust gas aftertreatment system 100 will be hereinafter interchangeably referred to as the "system 100". The system 100 is associated with an engine 102. The engine 102 is an internal combustion engine powered by a fuel, such as diesel, gasoline, natural gas, or a combination thereof. The system 100 is provided in fluid communication with the engine 102. The system 100 is adapted to receive exhaust gas from the engine 102 and treat the exhaust gas before being released into the atmosphere.

The system 100 includes an exhaust gas line 104. The exhaust gas line 104 is fluidly coupled to the engine 102. The exhaust gas line 104 is adapted to provide a passage for the exhaust gas to flow through the system 100. The system 100 includes a Selective Catalytic Reduction (SCR) unit 106 fluidly coupled to the exhaust gas line 104. The SCR unit 106 is adapted to reduce Nitrogen Oxides (NOx) present in the exhaust gas. The system 100 also includes a dosing unit 108 and a mixing unit 110 provided in the exhaust gas line 104. Each of the dosing unit 108 and the mixing unit 110 is disposed upstream of the SCR unit 106.

The dosing unit 108 includes a reductant tank 112 adapted to store a reductant fluid therein, such as a Diesel Exhaust Fluid (DEF). The dosing unit 108 also includes a reductant injector 114 fluidly coupled to the reductant tank 112 and the exhaust gas line 104. The reductant injector 114 is adapted to deliver a predefined volume of the reductant from the reductant tank 112 into the exhaust gas line 104. The mixing unit 110 is adapted to provide mixing of the reductant fluid with the exhaust gas within the exhaust gas line 104. Additionally, or optionally, the system 100 may include other components (not shown), such as a Diesel Particulate Filter (DPF), a Diesel Oxidation Catalyst (DOC), an Ammonia Oxidation Catalyst (AOC), based on application requirements.

The system 100 also includes an exhaust gas burner assembly 116 fluidly coupled to the exhaust gas line 104. The exhaust gas burner assembly 116 will be hereinafter interchangeably referred to as the "assembly 116". More specifically, the assembly 116 is disposed downstream of the engine 102 and upstream of each of the dosing unit 108 and the mixing unit 110. The assembly 116 includes a fuel tank 118 adapted to store a fuel therein, such as gasoline, diesel, and the like. The assembly 116 includes an air source 120, such as an air compressor, adapted to provide a flow of air. The assembly 116 also includes a fluid injector 122 fluidly coupled to each of the fuel tank 118 and the air source 120. The fluid injector 122 is adapted to provide a combustible mixture of fuel and air. The assembly 116 further includes an ignitor 124 adapted to combust the combustible mixture within the exhaust gas line 104 to generate combustion products.

Figure 2:
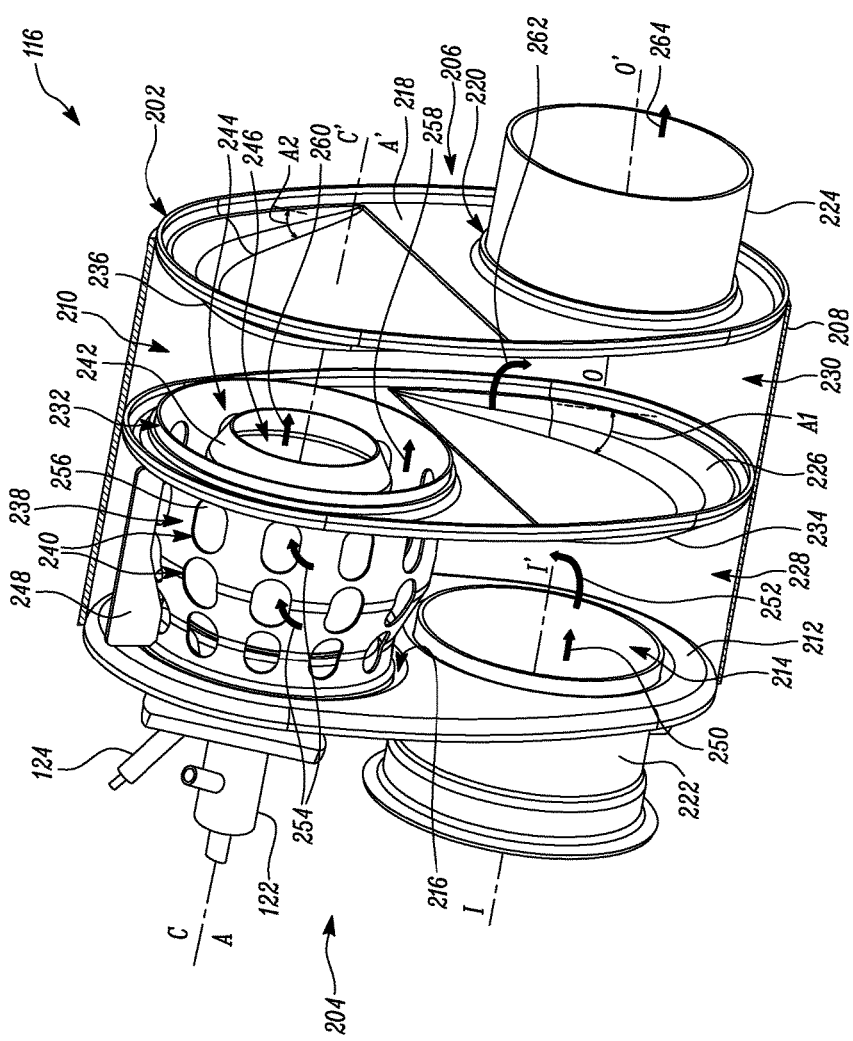
FIG. 2 is a partial perspective view of an exhaust gas burner assembly, according to an aspect of the present disclosure.

Referring to FIG. 2, a partial perspective view of an exemplary embodiment of the assembly 116 is illustrated. The assembly 116 includes a body 202. The body 202 includes an inlet end 204 and an outlet end 206 spaced apart from the inlet end 204. In the illustrated embodiment, the outlet end 206 is disposed opposite to the inlet end 204. The body 202 also includes a sidewall 208 extending between the inlet end 204 and the outlet end 206. It should be noted, that in the illustrated embodiment, a portion of the sidewall 208 is omitted for the purpose of clarity and explanation. The body 202 defines an internal volume 210 between the inlet end 204, the outlet end 206, and the sidewall 208.

The assembly 116 includes an inlet plate 212 coupled to the body 202. More specifically, the inlet plate 212 is provided at the inlet end 204. The inlet plate 212 has a substantially flat configuration. The inlet plate 212 defines an inlet opening 214. The inlet opening 214 further defines an inlet axis I-I'. The inlet axis I-I' may be substantially perpendicular to a plane of the inlet opening 214. The inlet opening 214 is adapted to allow ingress of the exhaust gas inside the body 202 along the inlet axis I-I'. The inlet plate 212 also includes a combustion opening 216. The combustion opening 216 is disposed spaced apart with respect to the inlet opening 214. The combustion opening 216 defines a combustion axis C-C'. The combustion axis C-C' is substantially parallel and spaced apart with respect to the inlet axis I-I'.

The assembly 116 includes the fluid injector 122 mounted on the inlet plate 212. More specifically, the fluid injector 122 is provided in fluid communication with the combustion opening 216. The fluid injector 122 is adapted to discharge the combustible mixture into the internal volume 210 of the body 202 of the assembly 116. The assembly 116 also includes the ignitor 124 mounted on the inlet plate 212. More specifically, the ignitor 124 is provided in the combustion opening 216. The ignitor 124 is adapted to ignite the combustible mixture discharged by the fluid injector 122 into the internal volume 210 to generate combustion products. It should be noted that location of the combustion opening 216, the fluid injector 122, and/or the ignitor 124 described herein is merely exemplary and may vary based on application requirements. For example, in other embodiments, the combustion opening 216, the fluid injector 122, and/or the ignitor 124 may be alternatively disposed on the sidewall 208.

The assembly 116 includes an outlet plate 218 coupled to the body 202. More specifically, the outlet plate 218 is provided at the outlet end 206. The outlet plate 218 is disposed opposite to and substantially parallel with respect to the inlet plate 212. The outlet plate 218 has a substantially flat configuration. The outlet plate 218 includes an outlet opening 220. The outlet opening 220 defines an outlet axis O-O'. In the illustrated embodiment, the outlet axis O-O' is aligned with respect to the inlet axis I-I'. Specifically, the inlet axis I-I' is substantially parallel to the outlet axis O-O'. The outlet opening 220 is adapted to allow egress of the exhaust gas from the body 202 along the outlet axis O-O'.

The assembly 116 includes an inlet member 222 mounted on the inlet plate 212. The inlet member 222 has a substantially hollow and cylindrical configuration. More specifically, the inlet member 222 is fluidly coupled to the inlet opening 214 and is axially aligned with respect to the inlet axis I-I'. The inlet member 222 is adapted to fluidly couple the inlet opening 214 and the assembly 116 to the exhaust gas line 104. The assembly 116 also includes an outlet member 224 mounted on the outlet plate 218. The outlet member 224 has a substantially hollow and cylindrical configuration. More specifically, the outlet member 224 is fluidly coupled to the outlet opening 220 and is axially aligned with respect to the outlet axis O-O'. The outlet member 224 is adapted to fluidly couple the outlet opening 220 and the assembly 116 to the exhaust gas line 104.

The assembly 116 includes an intermediate plate 226 disposed within the body 202. The intermediate plate 226 is disposed substantially parallel and spaced apart with respect to each of the inlet plate 212 and the outlet plate 218. Accordingly, the intermediate plate 226 divides the internal volume 210 of the body 202 into a first chamber 228 and a second chamber 230. The first chamber 228 is provided between the inlet plate 212 and the intermediate plate 226. The second chamber 230 is provided between the outlet plate 218 and the intermediate plate 226.

The intermediate plate 226 includes an intermediate opening 232. The intermediate opening 232 defines an intermediate axis A-A'. In the illustrated embodiment, the intermediate axis A-A' is axially aligned with respect to the combustion axis C-C'. Also, the intermediate axis A-A' is substantially parallel to and spaced apart with respect to each of the inlet axis I-I' and the outlet axis O-O'. Accordingly, the intermediate opening 232 is disposed spaced apart from each of the inlet opening 214 and the outlet opening 220. The intermediate opening 232 is adapted to fluidly couple the first chamber 228 to the second chamber 230.

The intermediate plate 226 includes an inlet flow deflector 234 provided thereon. The inlet flow deflector 234 is provided adjacent to the intermediate opening 232 and opposite to the inlet opening 214. The inlet flow deflector 234 defines an angle "A1" with respect to the intermediate plate 226. A value of the angle "A1' may range from about 10 degrees (°) to about 20° and may vary based on application requirements. In the illustrated embodiment, the inlet flow deflector 234 is integrally formed with the intermediate plate 226. In other embodiments, the inlet flow deflector 234 may be a separate component affixed to the inlet plate 212. The inlet flow deflector 234 is adapted to deflect the exhaust gas entering the first chamber 228 from the inlet opening 214 toward the intermediate opening 232.

Figure 3:
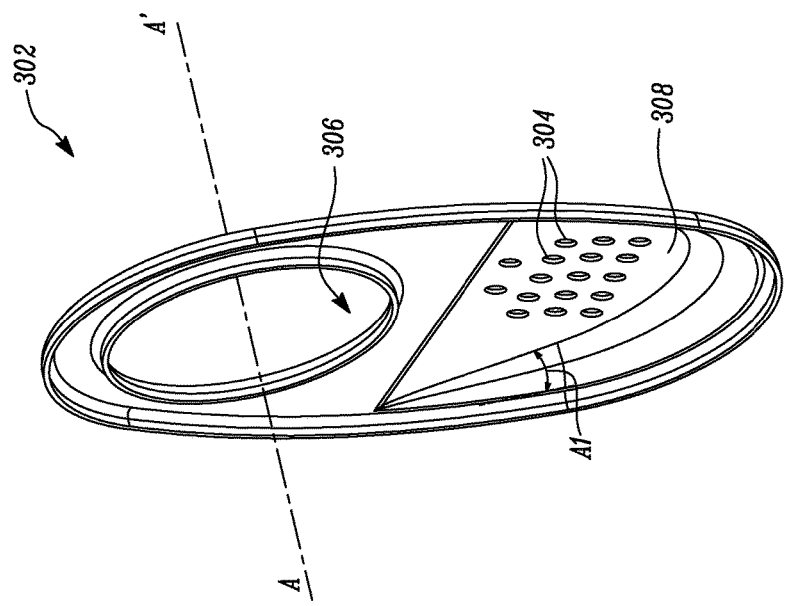
FIG. 3 is a perspective view of an intermediate plate of the exhaust gas burner assembly of FIG. 2, according to an aspect of the present disclosure.

Referring to FIG. 3, a perspective view of another embodiment of the intermediate plate 302 is illustrated. In the illustrated embodiment, the intermediate plate 302 includes a plurality of apertures 304 provided thereon. Each of the plurality of apertures 304 is provided spaced apart with respect to one another and the intermediate opening 306. More specifically, each of the plurality of apertures 304 is provided on the inlet flow deflector 308. In the illustrated embodiment, each of the plurality of apertures 304 includes a substantially circular configuration. In other embodiments, one or more of the plurality of apertures 304 may include any other configuration, such as elliptical, polygonal, and the like. Each of the plurality of apertures 304 is adapted to provide a bypass flow of at least a portion of the exhaust gas therethrough directly from the first chamber 228 to the second chamber 230.

Referring to FIG. 1, the outlet plate 218 includes an outlet flow deflector 236 provided thereon. The outlet flow deflector 236 is provided adjacent to the outlet opening 220 and opposite to the intermediate opening 232. The outlet flow deflector 236 defines an angle "A2" with respect to the outlet plate 218. A value of the angle "A2' may range from about 10° to about 20° and may vary based on application requirements. In the illustrated embodiment, the outlet flow deflector 236 is integrally formed with the intermediate plate 226. In other embodiments, the outlet flow deflector 236 may be a separate component affixed to the outlet plate 218. The outlet flow deflector 236 is adapted to deflect the exhaust gas entering the second chamber 230 from the intermediate opening 232 toward the outlet opening 220.

The assembly 116 includes a perforated pipe 238 disposed within the internal volume 210 of the body 202. More specifically, the perforated pipe 238 is disposed in the first chamber 228 between the inlet plate 212 and the intermediate plate 226. The perforated pipe 238 is axially aligned with respect to the combustion axis C-C' and the intermediate axis A-A'. Accordingly, the perforated pipe 238 is fluidly coupled to each of the combustion opening 216 and the intermediate opening 232. In the illustrated embodiment, the perforated pipe 238 includes a varying diameter along a length thereof, such that the diameter of the perforated pipe 238 adjacent to the inlet plate 212 is smaller than the diameter of the perforated pipe 238 adjacent to the intermediate plate 226. In other embodiments, the perforated pipe 238 may include a constant diameter along the length thereof, based on application requirements.

The perforated pipe 238 includes a plurality of openings 240 provided thereon. Each of the plurality of openings 240 is provided spaced apart with respect to one another. In the illustrated embodiment, each of the plurality of openings 240 includes a substantially elliptical configuration. In other embodiments, one or more of the plurality of openings 240 may include any other configuration, such as circular, polygonal, and the like. Also, in the illustrated embodiment, the plurality of openings 240 has a similar size. In other embodiments, the plurality of openings 240 may have different sizes relative to each other. Each of the plurality of openings 240 is adapted to allow flow of at least a portion of the exhaust gas therethrough from the first chamber 228 to the second chamber 230.

The assembly 116 includes a combustion liner 242 disposed within the perforated pipe 238. More specifically, the combustion liner 242 is disposed coaxially and concentrically with respect to the perforated pipe 238. Accordingly, an annular space 244 is defined between the perforated pipe 238 and the combustion liner 242. The combustion liner 242 has a substantially hollow and cylindrical configuration. Accordingly, the combustion liner 242 defines an internal space 246 therein. In an embodiment, the combustion liner 242 is coupled to the inlet plate 212.

Also, the combustion liner 242 is provided in association with each of the fluid injector 122 and the ignitor 124. Accordingly, the combustible mixture is discharged and ignited within the internal space 246 of the combustion liner 242 to generate the combustion products. As such, the combustion liner 242 is adapted to allow flow of the combustion products therethrough. The combustion liner 242 is axially aligned with respect to and fluidly coupled to the intermediate opening 232. Accordingly, the combustion liner 242 is adapted to allow the combustion products to flow through the intermediate opening 232 to the second chamber 230.

The assembly 116 includes a vortex plate 248 disposed on the perforated pipe 238. More specifically, the vortex plate 248 is provided in the first chamber 228 between the inlet plate 212 and the intermediate plate 226. In the illustrated embodiment, the vortex plate 248 includes a varying height along a length thereof, such that the height of the vortex plate 248 adjacent to the inlet plate 212 is greater than the height of the vortex plate 248 adjacent to the intermediate plate 226. In other embodiments, the vortex plate 248 may include a constant height along the length thereof, based on application requirements.

The vortex plate 248 is adapted to provide a balanced flow of the exhaust gas around the perforated pipe 238. More specifically, the vortex plate 248 is adapted to evenly distribute the flow of the exhaust gas around the perforated pipe 238, and further through each of the plurality of openings 240. In the illustrated embodiment, the assembly 116 includes a single vortex plate 248 provided on the perforated pipe 238. In other embodiments, the assembly 116 may include multiple vortex plate 248 disposed spaced apart with respect to one another on the perforated pipe 238.

During operation of the system 100, the exhaust gas is received in the first chamber 228 through the inlet member 222 and the inlet opening 214, as shown by arrow 250. The exhaust gas is deflected by the inlet flow deflector 234 toward the perforated pipe 238 as shown by arrow 252. At least a portion of the exhaust gas then flows through each of the plurality of openings 240 into the annular space 244 between the perforated pipe 238 and the combustion liner 242, as shown by arrows 254. Accordingly, the exhaust gas is directed on an outer surface 256 of the combustion liner 242. As such, the exhaust gas cools the combustion liner 242 as the exhaust gas flows around the outer surface 256 of the combustion liner 242.

Further, the exhaust gas flows out of the annular space 244 and the intermediate opening 232 into the second chamber 230, as shown by arrow 258. Also, the combustion products generated within the internal space 246 of the combustion liner 242 flow out of the internal space 246 and the intermediate opening 232 into the second chamber 230, as shown by arrow 260. The exhaust gas and the combustion products are then mixed in the second chamber 230 forming a heated mixture of the exhaust gas and the combustion products.

Further, the heated mixture is deflected by the outlet flow deflector 236 toward the outlet opening 220 as shown by arrow 262. The heated mixture then flows out of the second chamber 230 via the outlet opening 220 and the outlet member 224, as shown by arrow 264. Accordingly, the heated mixture exiting the assembly 116 from the outlet opening 220 has a higher temperature than the exhaust gas entering the assembly 116 through the inlet opening 214.

In some embodiments, when the intermediate plate 226 may include the plurality of apertures 304, each of the plurality of apertures 304 may allow the portion of the exhaust gas to bypass into the second chamber 230 from the first chamber 228. In such a situation, the portion of the exhaust gas may flow into the second chamber 230 from the first chamber 228 through each of the plurality of apertures 304 without flowing through each of the plurality of openings 240 and around the combustion liner 242, in turn, reducing backpressure within the assembly 116 and the system 100. The portion of the exhaust gas may then mix with the heated mixture in the second chamber 230. Accordingly, a mixture of the portion of the exhaust gas and the heated mixture may then flow out of the second chamber 230 via the outlet opening 220 and the outlet member 224.

Figure 4:
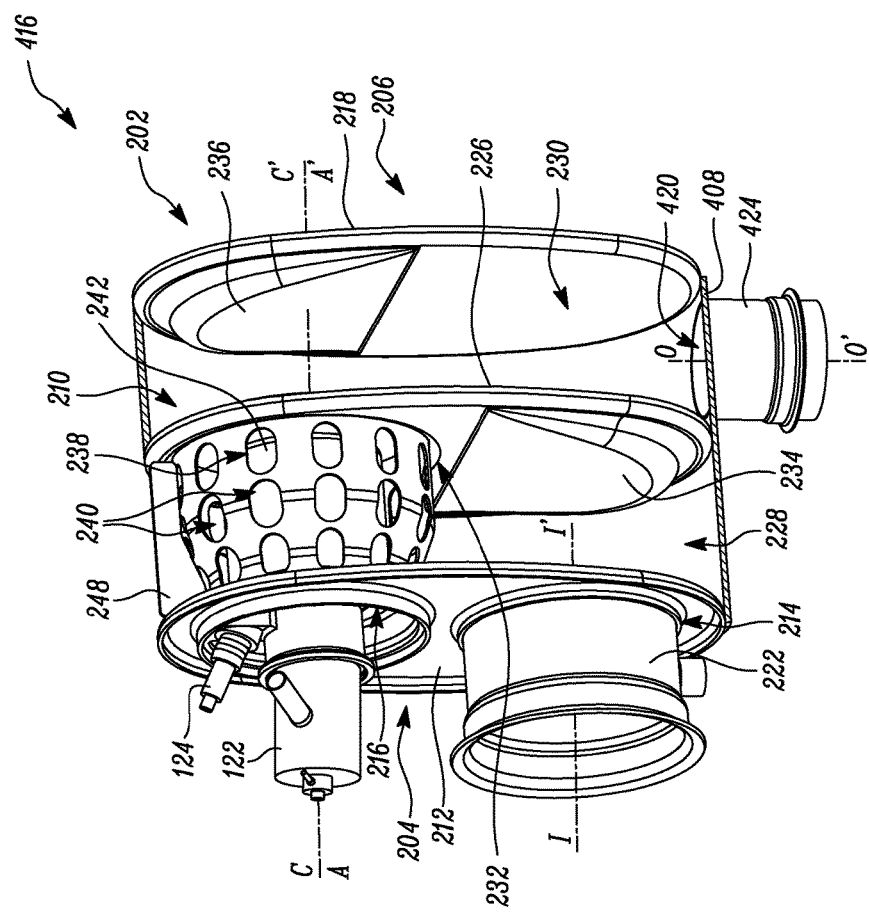
FIG. 4 is a partial perspective view of another exhaust gas burner assembly, according to another aspect of the present disclosure.

It should be noted that an overall configuration of the assembly 116, such as location of the inlet opening 214, the inlet member 222, the outlet opening 220, the outlet member 224, the intermediate plate 226, the first chamber 228, the second chamber 230, and the like, is merely exemplary and may vary based on application requirements. For example, referring to FIG. 4, a partial perspective view of another exemplary embodiment of an assembly 416 is illustrated. The assembly 416 has a configuration substantially similar to a configuration of the assembly 116. In the illustrated embodiment, an outlet opening 420 and an outlet member 424 is disposed on a sidewall 408. Accordingly, the inlet axis I-I' is substantially perpendicular with respect to the outlet axis O-O'.

Figure 5:
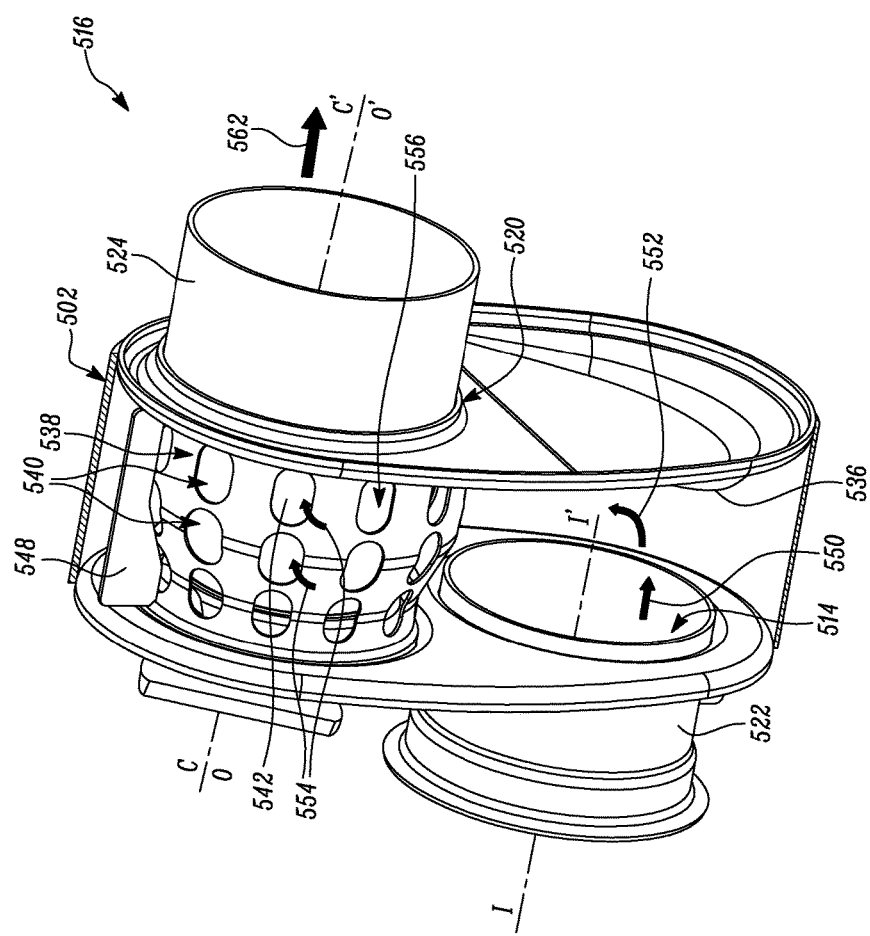
FIG. 5 is a partial perspective view of another exhaust gas burner assembly, according to another aspect of the present disclosure.
Figure 6:
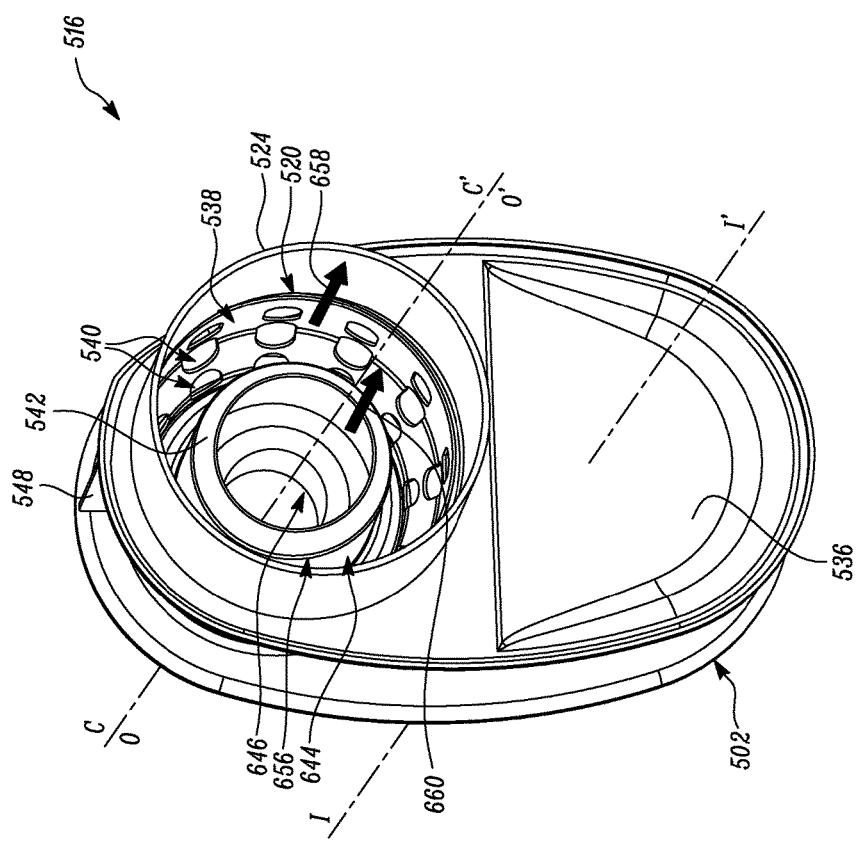
FIG. 6 is another partial perspective view of the exhaust gas burner assembly of FIG. 5, according to an aspect of the present disclosure.

Referring to FIGS. 5 and 6, partial perspective views of another exemplary embodiment of an assembly 516 is illustrated. In the illustrated embodiment, the intermediate plate 226, as shown in FIG. 2, is omitted. In such a situation, each of a perforated pipe 538 and a combustion liner 542 is fluidly coupled with an outlet opening 520 and an outlet member 524. Accordingly, the inlet axis I-I' is substantially parallel to and spaced apart with respect to the outlet axis O-O'. Also, an outlet flow deflector 536 is disposed opposite to an inlet opening 514.

In such an embodiment, the exhaust gas flows into a body 502 of the assembly 516 through an inlet member 522 and the inlet opening 514, as shown by arrow 550. The exhaust gas is deflected by the outlet flow deflector 536 toward the perforated pipe 538, as shown by arrow 552. The exhaust gas then flows through each of a plurality of openings 540 into an annular space 644 between the perforated pipe 538 and the combustion liner 542, as shown by arrows 554. Accordingly, the exhaust gas is directed on an outer surface 656 of the combustion liner 542. As such, the exhaust gas cools the combustion liner 542 as the exhaust gas flows around the outer surface 656 of the combustion liner 542.

Further, the exhaust gas flows out of the annular space 644 and the outlet opening 520 into the outlet member 524, as shown by arrow 658. Also, the combustion products generated within an internal space 646 of the combustion liner 542 flow out of the internal space 646 and the outlet opening 520 into the outlet member 524, as shown by arrow 660. The exhaust gas and the combustion products are then mixed in the outlet member 524 forming the heated mixture of the exhaust gas and the combustion products. The heated mixture then flows out of the outlet member 524, as shown by arrow 562. Accordingly, the heated mixture exiting the assembly 516 from the outlet member 524 has a higher temperature than the exhaust gas entering the assembly 516 through the inlet opening 514.

The assemblies 116, 416, 516 include the perforated pipes 238, 538 provided around the combustion liners 242, 542, respectively, such that the exhaust gas is allowed to flow around the outer surfaces 256, 656 of the combustion liners 242, 542, respectively. More specifically, each of the plurality of openings 240, 540 on the perforated pipes 238, 538 allow impingement of the exhaust flow on the outer surfaces 256, 656 of the combustion liners 242, 542, respectively. As a result, convective heat transfer between the exhaust gas and the outer surfaces 256, 656 of the combustion liners 242, 542 provides reduction of a skin temperature of the combustion liners 242, 542, respectively. Further, the reduction of the skin temperature of each of the combustion liners 242, 542 limits use of exotic and/or expensive material for each of the combustion liners 242, 542, in turn, reducing costs.

The assemblies 116, 416, 516 also include the vortex plates 248, 548 provided in association with the perforated pipes 238, 538, respectively. The vortex plates 248, 548 allows even distribution of the exhaust gas around the perforated pipes 238, 538, respectively. This, in turn, provides balanced impingement of the exhaust gas on the outer surfaces 256, 656 of the combustion liners 242, 542 and, thus, uniform cooling of the combustion liners 242, 542, respectively. Further, each of the plurality of openings 240, 540 on the perforated pipes 238, 538 may be modified, based on application requirements, in order to control a mass flow rate and a flow velocity of the exhaust gas around the combustion liners 242, 542 to provide optimum cooling of the combustion liners 242, 542, respectively.

The assemblies 116, 416 also include the inlet flow deflector 234. The inlet flow deflector 234 limits formation of vortices or static flow regions within the first chamber 228 and directs the exhaust flow toward the perforated pipe 238. The assemblies 116, 416, 516 also include the respective outlet flow deflectors 236, 536. The outlet flow deflectors 236, 536 limit formation of vortices or static flow regions within the second chamber 230 and directs the exhaust flow toward the respective outlet openings 220, 420, 520. As such, each of the inlet flow deflector 234 and the outlet flow deflectors 236, 536 provides improved flow pattern and reduced turbulence in the flow of exhaust gas within each of the respective assemblies 116, 416, 516, in turn, improving performance.

The assemblies 116, 416, 516 provide a simple, effective, and cost-efficient method to heat the exhaust gas to a desired temperature upstream of the dosing unit 108, the mixing unit 110, and the SCR unit 106. The assemblies 116, 416, 516 provide a compact package, in turn, reducing an overall footprint of the assemblies 116, 416, 516. The assemblies 116, 416, 516 may be retrofitted in any aftertreatment system with little or no modification to the existing system, in turn, improving system compatibility and flexibility.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An exhaust gas burner assembly comprising:
a body extending between an inlet end and an outlet end, wherein the body defines an internal volume;
an inlet plate coupled to the body at the inlet end, wherein the inlet plate defines an inlet opening adapted to allow ingress of an exhaust gas inside the body along an inlet axis and a combustion opening spaced apart from the inlet opening;
an outlet plate coupled to the body at the outlet end, wherein the outlet plate defines an outlet opening adapted to allow egress of the exhaust gas from the body along an outlet axis;
an intermediate plate disposed within the body and dividing the internal volume of the body into a first chamber and a second chamber, wherein the intermediate plate defines an intermediate opening spaced apart from the inlet opening to fluidly couple the first chamber to the second chamber;
a perforated pipe disposed in the first chamber between the inlet plate and the intermediate plate, the perforated pipe being fluidly coupled with the intermediate opening, wherein the perforated pipe defines a plurality of openings therethrough;
a fluid injector mounted on the inlet plate and fluidly coupled with the combustion opening, wherein the fluid injector is adapted to discharge a combustible mixture; and
an igniter adapted to ignite the combustible mixture to generate combustion products;
wherein the plurality of openings of the perforated pipe allow at least a portion of the exhaust gas to flow to the second chamber such that the exhaust gas exiting the outlet opening has a higher temperature than the exhaust gas entering through the inlet opening.

2. The exhaust gas burner assembly of claim 1 further comprising a combustion liner disposed within the perforated pipe and adapted to allow flow of the combustion products therethrough, wherein the combustion liner is fluidly coupled with the intermediate opening to allow the combustion products to flow through the intermediate opening to the second chamber.

3. The exhaust gas burner assembly of claim 1 further comprising a vortex plate disposed on the perforated pipe, the vortex plate adapted to provide a balanced flow of the exhaust gas around the perforated pipe.

4. The exhaust gas burner assembly of claim 1, wherein the intermediate plate further comprises an inlet flow deflector adapted to deflect the exhaust gas entering from the inlet opening toward the intermediate opening.

5. The exhaust gas burner assembly of claim 1, wherein the intermediate plate further comprises a plurality of apertures, each of the plurality of apertures adapted to allow at least a portion of the exhaust gas to bypass into the second chamber from the first chamber.

6. The exhaust gas burner assembly of claim 1, wherein the inlet axis is parallel to the outlet axis.

7. The exhaust gas burner assembly of claim 1, wherein the inlet axis is orthogonal to the outlet axis.

8. The exhaust gas burner assembly of claim 1 further comprising:

an inlet member mounted on the inlet plate, wherein the inlet member is fluidly coupled with the inlet opening, and an outlet member mounted on the outlet plate, wherein the outlet member is fluidly coupled with the outlet opening.

9. The exhaust gas burner assembly of claim 1 further comprising an outlet flow deflector coupled to the outlet plate, wherein the outlet flow deflector is adapted to deflect the combustion products and the exhaust gas exiting the intermediate opening toward the outlet opening.

10. An exhaust gas aftertreatment system comprising:
an exhaust gas line adapted to receive exhaust gas from an engine;
at least one exhaust gas aftertreatment component disposed downstream of the exhaust gas line; and
an exhaust gas burner assembly disposed between the exhaust gas line and the at least one exhaust gas aftertreatment component, the exhaust gas burner assembly including:
a body extending between an inlet end and an outlet end, wherein the body defines an internal volume;
an inlet plate coupled to the body at the inlet end, wherein the inlet plate defines an inlet opening adapted to allow ingress of the exhaust gas inside the body along an inlet axis and a combustion opening spaced apart from the inlet opening;
an outlet plate coupled to the body at the outlet end, wherein the outlet plate defines an outlet opening adapted to allow egress of at least the exhaust gas from the body along an outlet axis;
an intermediate plate disposed within the body and dividing the internal volume of the body into a first chamber and a second chamber, wherein the intermediate plate defines an intermediate opening spaced apart from the inlet opening to fluidly couple the first chamber to the second chamber;
a perforated pipe disposed in the first chamber between the inlet plate and the intermediate plate, the perforated pipe being fluidly coupled with the intermediate opening, wherein the perforated pipe defines a plurality of openings therethrough;
a fluid injector mounted on the inlet plate and fluidly coupled with the combustion opening, wherein the fluid injector is adapted to discharge a combustible mixture;
an igniter adapted to ignite the combustible mixture to generate combustion products; and
a combustion liner disposed within the perforated pipe and adapted to allow flow of the combustion products therethrough, wherein the combustion liner is fluidly coupled with the intermediate opening to allow the combustion products to flow through the intermediate opening to the second chamber;
wherein the plurality of openings of the perforated pipe allow flow of at least a portion of the exhaust gas around an outer surface of the combustion liner for cooling the combustion liner, and wherein the intermediate opening allows the exhaust gas to flow to the second chamber such that the exhaust gas exiting the outlet opening has a higher temperature than the exhaust gas entering through the inlet opening.

11. The exhaust gas aftertreatment system of claim 10 further comprising a vortex plate disposed on the perforated pipe, the vortex plate adapted to provide a balanced flow of the exhaust gas around the outer surface of the combustion liner.

12. The exhaust gas aftertreatment system of claim 10, wherein the intermediate plate further comprises an inlet flow deflector adapted to deflect the exhaust gas entering from the inlet opening toward the intermediate opening.

13. The exhaust gas aftertreatment system of claim 10, wherein the intermediate plate further comprises a plurality of apertures, each of the plurality of apertures adapted to allow at least a portion of the exhaust gas to bypass into the second chamber from the first chamber.

14. The exhaust gas aftertreatment system of claim 10, wherein the inlet axis is parallel to the outlet axis.

15. The exhaust gas aftertreatment system of claim 10, wherein the inlet axis is orthogonal to the outlet axis.

16. The exhaust gas aftertreatment system of claim 10, further comprising:
an inlet member mounted on the inlet plate, wherein the inlet member is fluidly coupled with the inlet opening; and
an outlet member mounted on the outlet plate, wherein the outlet member is fluidly coupled with the outlet opening.

17. The exhaust gas aftertreatment system of claim 10 further comprising an outlet flow deflector coupled to the outlet plate, wherein the outlet flow deflector is adapted to deflect the combustion products and the exhaust gas exiting the intermediate opening toward the outlet opening.

18. The exhaust gas aftertreatment system of claim 17, wherein the outlet flow deflector is inclined with respect to the outlet plate.

19. An exhaust gas burner assembly comprising:
a body extending between an inlet end and an outlet end, wherein the body defines an internal volume;
an inlet plate coupled to the body at the inlet end, wherein the inlet plate defines an inlet opening adapted to allow ingress of an exhaust gas inside the body along an inlet axis and a combustion opening spaced apart from the inlet opening;
an outlet plate coupled to the body at the outlet end, wherein the outlet plate defines an outlet opening adapted to allow egress of at least the exhaust gas from the body along an outlet axis;
a perforated pipe disposed between the inlet plate and the outlet plate, the perforated pipe being fluidly coupled with the outlet opening, wherein the perforated pipe defines a plurality of openings therethrough;
a fluid injector mounted on the inlet plate and fluidly coupled with the combustion opening, wherein the fluid injector is adapted to discharge a combustible mixture;
an igniter adapted to ignite the combustible mixture to generate combustion products; and
a vortex plate disposed on the perforated pipe, the vortex plate adapted to provide a balanced flow of the exhaust gas around the perforated pipe;
wherein the exhaust gas exiting the outlet opening has a higher temperature than the exhaust gas entering through the inlet opening.

20. The exhaust gas burner assembly of claim 19 further comprising a combustion liner disposed within the perforated pipe and adapted to allow flow of the combustion products therethrough, wherein the combustion liner is fluidly coupled with the outlet opening to allow the combustion products to flow from the combustion liner to the outlet opening, wherein the plurality of openings of the perforated pipe allow flow of the exhaust gas around an outer surface of the combustion liner for cooling the combustion liner, and wherein the vortex plate is further adapted to provide a balanced flow of the exhaust gas around the outer surface of the combustion liner.

\* \* \* \* \*